(12) United States Patent
Kudo

(10) Patent No.: US 11,465,501 B2
(45) Date of Patent: Oct. 11, 2022

(54) WORK VEHICLE

(71) Applicant: Yanmar Power Technology Co., Ltd., Osaka (JP)

(72) Inventor: Junko Kudo, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 86 days.

(21) Appl. No.: 16/968,159

(22) PCT Filed: Dec. 4, 2018

(86) PCT No.: PCT/JP2018/044615
§ 371 (c)(1),
(2) Date: Aug. 7, 2020

(87) PCT Pub. No.: WO2019/155745
PCT Pub. Date: Aug. 15, 2019

(65) Prior Publication Data
US 2021/0370772 A1    Dec. 2, 2021

(30) Foreign Application Priority Data

Feb. 8, 2018    (JP) .............................. JP2018-020904

(51) Int. Cl.
*B60Q 1/00*    (2006.01)
*B60K 35/00*    (2006.01)
(Continued)

(52) U.S. Cl.
CPC ............ *B60K 35/00* (2013.01); *A01B 69/008* (2013.01); *G07C 5/0825* (2013.01);
(Continued)

(58) Field of Classification Search
CPC .............. B60K 35/00; B60K 2370/152; B60K 2370/172; B60K 2370/797; A01B 69/008;
(Continued)

(56) References Cited

U.S. PATENT DOCUMENTS 4,589,425 A * 5/1986 Mitchell, Jr. ......... A01F 12/444
460/99
2017/0015368 A1    1/2017 Yanmar
(Continued)

FOREIGN PATENT DOCUMENTS

JP    2007-308116    11/2007
JP    2013-071843    4/2013
(Continued)

*Primary Examiner* — Toan N Pham
(74) *Attorney, Agent, or Firm* — Chris Mizumoto

(57) ABSTRACT

The purpose of the present invention is to improve visibility of a status display unit while simplifying the installation of the status display unit and preventing damage to the status display unit. The present invention comprises: a work vehicle body capable of traveling automatically; a status detection unit that detects the status of the work vehicle body; and status display units that show a status display according to the status of the work vehicle body detected by the status detection unit. At least one pair of status display units are arranged diagonally across the work vehicle body in plan view.

5 Claims, 14 Drawing Sheets

(51) Int. Cl.
*A01B 69/04* (2006.01)
*G07C 5/08* (2006.01)

(52) U.S. Cl.
CPC .. *B60K 2370/152* (2019.05); *B60K 2370/172* (2019.05); *B60K 2370/797* (2019.05)

(58) Field of Classification Search
CPC ...... A01B 76/00; A01B 69/00; G07C 5/0825; B60Q 1/0035; B60Q 5/005; B60Q 1/2615; B60Q 1/50; B60Q 9/00; B62D 51/001; B62D 49/00; B62D 25/08; G08B 5/36; F21S 43/19
See application file for complete search history.

(56) References Cited

U.S. PATENT DOCUMENTS

| | | | |
|---|---|---|---|
| 2017/0322550 A1 | 11/2017 | Yanamr | |
| 2019/0248421 A1* | 8/2019 | Jacobsthal | B60H 1/00378 |
| 2019/0384321 A1* | 12/2019 | Nishi | B62D 49/06 |

FOREIGN PATENT DOCUMENTS

| | | |
|---|---|---|
| JP | 2015-189450 | 11/2015 |
| JP | 2016-094093 | 5/2016 |
| JP | 3209576 U | 3/2017 |

\* cited by examiner

WORK VEHICLE

CROSS-REFERENCE

This application is a US National Stage Application under 35 U.S.C. § 371 of International Application No. PCT/JP2018/044615 filed Dec. 4, 2018, which claims foreign priority of JP2018-020904 filed Feb. 8, 2018, the disclosures of which are hereby incorporated by reference in their entirety.

TECHNICAL FIELD

The present invention relates to a work vehicle capable of automatically traveling.

BACKGROUND ART

A work vehicle such as that described above acquires a current position of the work vehicle by using a satellite positioning system and automatically travels along a preset target traveling route (see, for example, Patent Literature 1).

It is desirable that such a work vehicle includes a state display part configured to display a state of the work vehicle so that a user, a person in the vicinity of the work site, or the like can grasp the state of the work vehicle. Therefore, a work vehicle described in Patent Literature 1 includes a state display part including a plurality of lamps, speakers, and the like arranged above a cabin. An antenna unit including a GPS antenna of a satellite positioning system, a data receiving antenna, and the like is arranged above the cabin, and the state display part is provided in the antenna unit.

CITATION LIST

Patent Literature

Patent Literature 1: Japanese Unexamined Patent Application Publication No. 2016-94093

DISCLOSURE OF INVENTION

Problems to be Solved by the Invention

It is preferable that a state display part is arranged at a position in a work vehicle where a user, a person in the vicinity of the work site, or the like can easily visually recognize the state display part. In this regard, in the work vehicle described in Patent Literature 1, the state display part is provided above the cabin, and thus, the state display part is arranged at a position where a user, a person in the vicinity of the work site, or the like can easily visually recognize the state display part.

However, if the state display part is mounted above the cabin, a mounting position of the state display part is at a high position, and thus, it takes labor to mount the state display part. Further, the state display part protrudes upward from an upper part of the cabin. Therefore, the vehicle height increases and when the work vehicle is transported or when the work vehicle is stored in a barn or the like, the state display part may come into contact with an object to sustain damage.

In view of this situation, a main object of the present invention is to provide a work vehicle capable of improving the visibility of a state display part while simplifying a mounting task of the state display part and preventing damage to the state display part.

Means for Solving the Problems

In a first characteristic configuration of the present invention, a work vehicle main body capable of automatically traveling, a state detection part configured to detect a state of the work vehicle main body, and a state display part configured to provide a state display in accordance with the state of the work vehicle main body detected in the state detection part are provided, and the state display part includes a pair of the state display parts arranged diagonally opposed corners of the work vehicle main body, and the state display part is not arranged at diagonally opposed corners intersecting a diagonal line connecting the diagonally opposed corners where the pair of state display parts are arranged in a plan view.

According to the present configuration, the state display part includes the pair of state display parts arranged at diagonally opposed corners of the work vehicle main body, and thus, a user or a person in the vicinity of the work vehicle can visually recognize at least one of the pair of state display parts and the visibility of the state display part can be improved. In addition, the pair of state display parts may not be arranged above the cabin, but only at diagonally opposed corners of the work vehicle main body, and thus, the state display part may be arranged at a relatively low position. Therefore, it is possible to simplify a task in which the state display part is mounted, prevent the height of the work vehicle from increasing, and prevent damage to the state display part, and the like.

In a second characteristic configuration of the present invention, the work vehicle main body includes a cabin, and the state display part is arranged outside the cabin and inside an outer end of a traveling part of the work vehicle main body in a front view.

According to the present configuration, the state display part is arranged outside the cabin in a front view, and thus, it is possible to prevent the state display part from being hardly viewed by the cabin in the front view. Moreover, the state display part is arranged inside the outer end of the traveling part in the front view. Therefore, the state display part does not protrude outside the traveling part in a left-right direction of the work vehicle main body, and thus, it is possible to prevent the state display part from contacting an object to sustain damage, for example, while the work vehicle main body automatically travels.

In a third characteristic configuration of the present invention, a muffler is provided in front of the cabin and on one side in a left-right direction of the cabin, and one state display part of the pair of state display parts is arranged in front of the cabin and on an opposite side of the muffler in the left-right direction of the cabin.

According to the present configuration, the state display part is arranged on the opposite side of the muffler in the left-right direction of the cabin, and thus, the state display part may be arranged at a position where the visibility of the state display part can be improved, without hindering the muffler.

In a fourth characteristic configuration of the present invention, the state display part is provided attachably and detachably with respect to a cabin frame of the cabin via a support stay.

According to the present configuration, the state display part is attachable and detachable with respect to the cabin frame via the support stay, and thus, the state display part can be attached and detached as needed, which is convenient. Further, it is possible to attach the state display part to the work vehicle later, and thus, the work vehicle can be changed to a work vehicle for automatic traveling by attaching the state display part to the work vehicle later, as a result, the work can be simplified. In addition, the cabin formed of the cabin frame is typically supported via a vibration-proof member such as an elastic body, and thus, if the state display part is attached to the cabin frame via the support stay, the state display part may be arranged in a state where the transmission of vibrations to the state display part is prevented.

In a fifth characteristic configuration of the present invention, a state display control part configured to control a state display of the state display part is provided, and the state display control part is arranged inside an operation panel part in the cabin.

According to the present configuration, the state display control part is provided, and thus, the inside of the operation panel part can be effectively used for an arrangement position of the state display control part while the state display part can appropriately provide a state display. Typically, various types of control parts mounted on the work vehicle can be arranged inside the operation panel part, and thus, wiring of the control parts and the state display control part can be collectively stored, and the wiring and the wiring work can be simplified.

DESCRIPTION OF EMBODIMENTS

An embodiment in which a work vehicle according to the present invention is applied to an automatic traveling system will be described with reference to the drawings.

Figure 1:
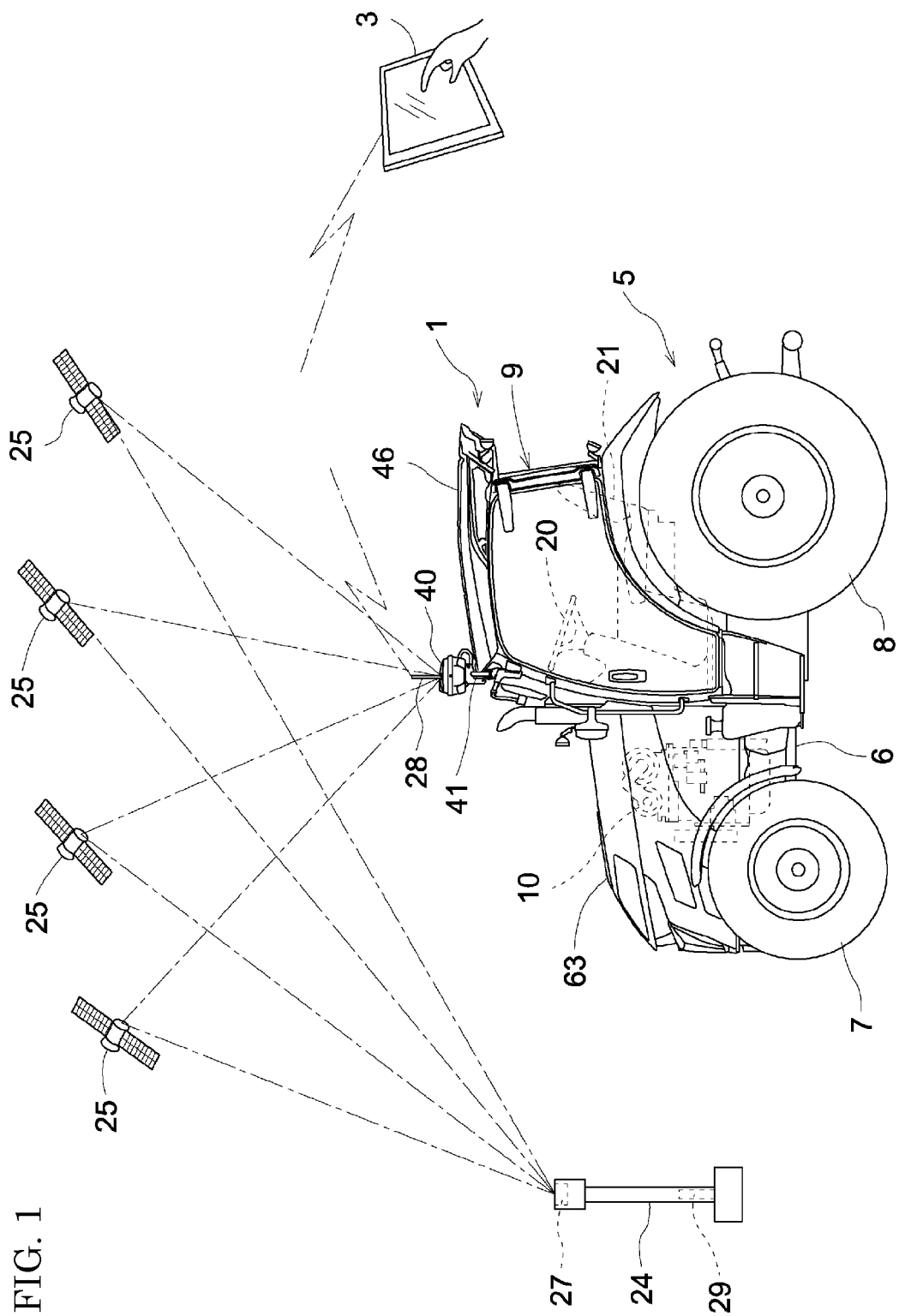
FIG. 1 is a diagram illustrating a simplified configuration of an automatic traveling system.

As illustrated in FIG. 1, in the automatic traveling system, a tractor 1 is employed for the work vehicle. However, other than a tractor, a riding-type work vehicle such as a riding-type rice transplanter, a combine, a riding-type grass mower, a wheel loader, and a snowplow, or an unmanned work vehicle such as an unmanned grass mower can also be employed.

Figure 2:
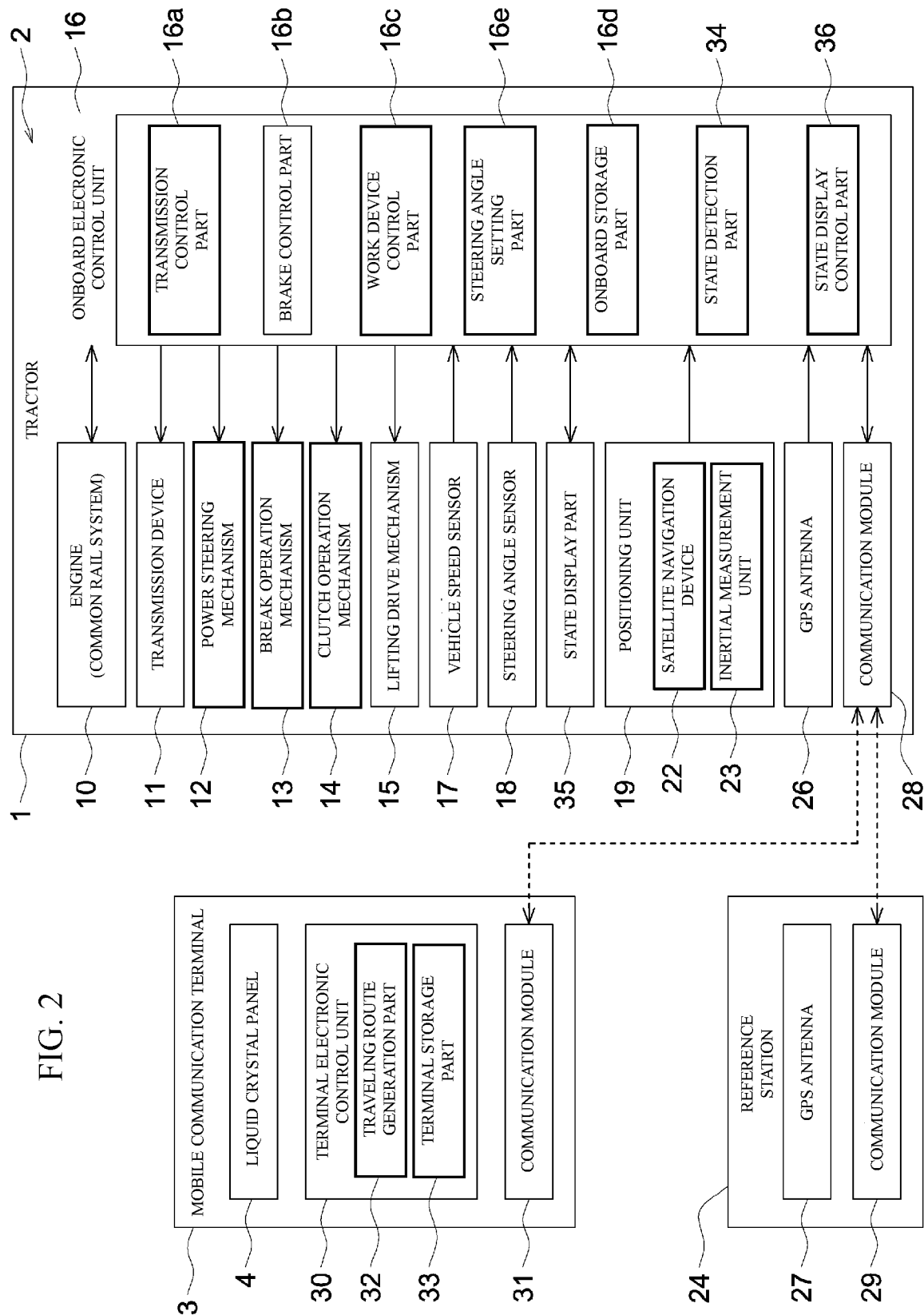
FIG. 2 is a block diagram illustrating a simplified configuration of the automatic traveling system.

As illustrated in FIGS. 1 and 2, the automatic traveling system includes an automatic traveling unit 2 mounted on the tractor 1 and a mobile communication terminal 3 set to communicate with the automatic traveling unit 2. For example, a tablet-type personal computer or a smartphone including a touch-operable liquid crystal panel 4 or the like may be employed for the mobile communication terminal 3.

The tractor 1 can have a configuration according to a rotary tilling specification by liftably and rollably coupling a rotary tilling device, being an example of a work device, to a rear part of the tractor 1 via a three-point link mechanism 5. Instead of the rotary tilling device, a work device such as a plow, a seeding device, and a spraying device may be coupled to the rear part of the tractor 1.

As illustrated in FIG. 1, the tractor 1 includes left and right front wheels 7 serving as drivable steering wheels, drivable left and right rear wheels 8, a cabin 9 forming a riding-type operation part, and an electronically controlled diesel engine (hereinafter, referred to as "engine") 10 including a common rail system. Further, as illustrated in FIG. 2, the tractor 1 includes an electronically controlled transmission device 11 configured to shift a power from the engine 10, a fully hydraulic power steering mechanism 12 configured to steer the left and right front wheels 7, left and right side brakes (not illustrated) configured to brake the left and right rear wheels 8, an electronically controlled brake operation mechanism 13 configured to hydraulically operate the left and right side brakes, a work clutch (not illustrated) configured to connect and disconnect transmission to a work device such as a rotary tilling device, an electronically controlled clutch operation mechanism 14 configured to hydraulically operate the work clutch, an electro-hydraulically controlled lifting drive mechanism 15 configured to drive a work device such as the rotary tilling device to raise and lower the work device, an onboard electronic control unit 16 including various types of control programs and the like relating to automatic traveling of the tractor 1 and the like, a vehicle speed sensor 17 configured to detect a vehicle speed of the tractor 1, a steering angle sensor 18 configured to detect the steering angle of the front wheels 7, a positioning unit 19 configured to measure a current position and a current azimuth of the tractor 1, and the like.

An electronically controlled gasoline engine including an electronic governor may be employed for the engine 10. A hydromechanical transmission (HMT), a hydrostatic transmission (HST), a belt-type transmission, or the like may be employed for the transmission device 11. An electric power steering mechanism 12 including an electric motor, or the like may be employed for the power steering mechanism 12.

As illustrated in FIG. 1, a steering wheel 20 that allows for manual steering of the left and right front wheels 7 via the power steering mechanism 12 and a seat 21 for a user are provided inside the cabin 9.

As illustrated in FIGS. 4 to 9 and 15, the cabin 9 is formed in a box shape including pillar frames 42 arranged at the four corners of the cabin 9, a windshield 43 covering a front side, a rear glass 44 covering a rear side, a pair of left and right doors 45 openable by swinging around an axis along an up-down direction, and a roof 46 on a ceiling side. The pillar frames 42 include a pair of left and right front pillars 47 arranged at a front end part and a pair of left and right rear pillars 48 arranged at a rear end part, and the front pillars 47 and the rear pillars 48 are arranged at positions corresponding to the four corners of the cabin 9 in a plan view.

Figure 15:
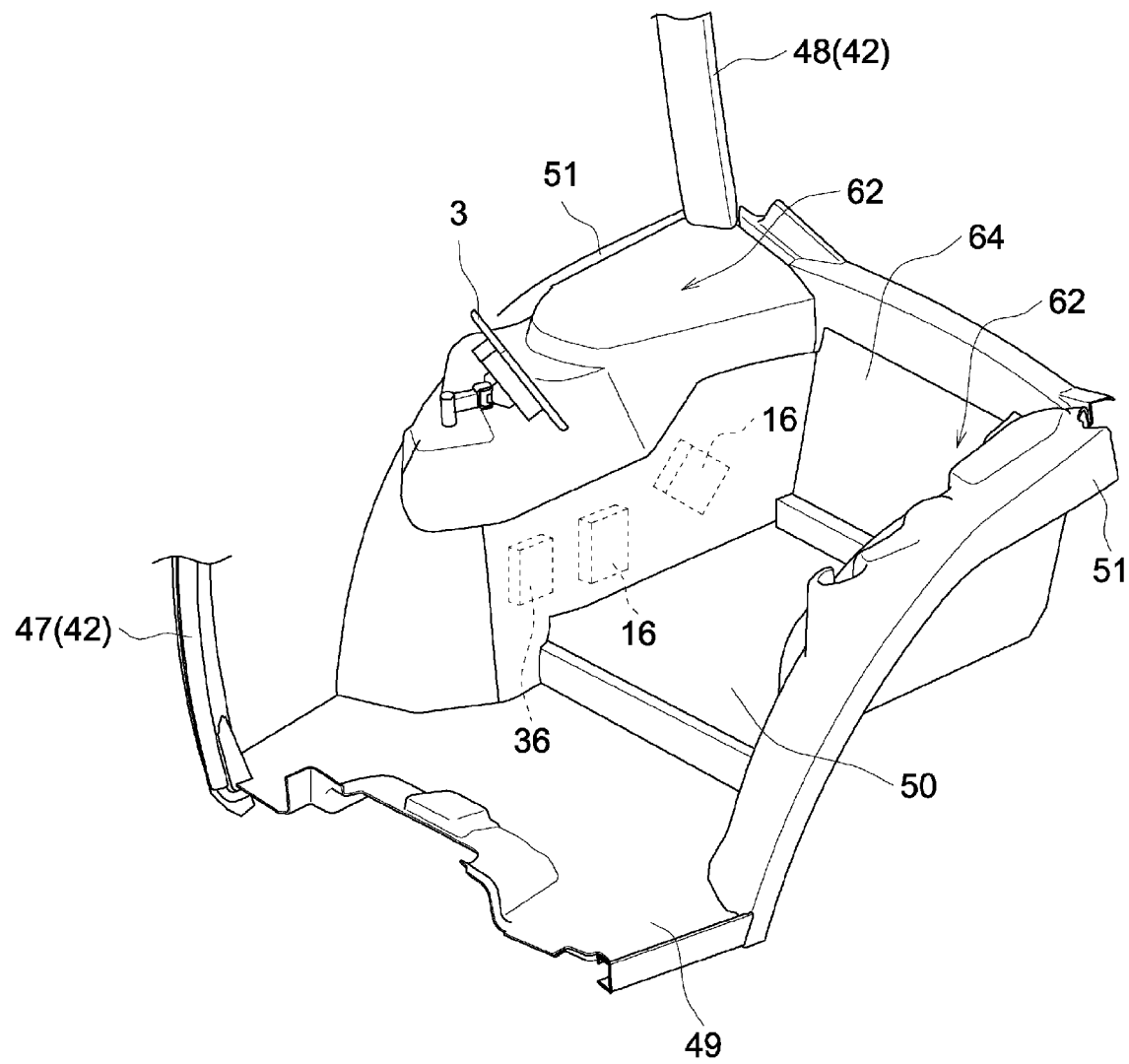
FIG. 15 is a perspective view illustrating the inside of a cabin.

As illustrated in FIG. 15, the cabin 9 includes a front floor frame 49 and a rear floor frame 50 that form a floor of the cabin 9. The steering wheel 20 (see FIG. 1) is arranged at the front side of the front floor frame 49 via a handle post or the like, and the seat 21 (see FIG. 1) is arranged above the rear floor frame 50. A rear frame 64 in an upright posture is provided behind the rear floor frame 50, and a pair of left and right fenders 51 are provided on both left and right sides of the rear floor frame 50 and the rear frame 64. Thus, the front floor frame 49, the rear floor frame 50, the rear frame 64, and the pair of left and right fenders 51 are integrally provided by welding or the like.

As illustrated in FIG. 15, the front pillars 47 are provided on the left and right front ends of the front floor frame 49, and the rear pillars 48 are provided on the rear ends of the pair of left and right fenders 51. The pillar frames 42 (the front pillars 47 and the rear pillars 48), the front floor frame 49, the rear floor frame 50, the rear frame 64, and the pair of left and right fenders 51 are integrally provided as a cabin frame forming the cabin 9. The cabin frame forming the cabin 9 is supported on a vehicle body 6 via a vibration-proof member such as an elastic body, and the cabin 9 is provided in a state where anti-vibration measures are taken to prevent vibrations from the engine 10 and the like from being transmitted to the cabin 9.

As illustrated in FIG. 2, the onboard electronic control unit 16 includes a transmission control part 16a configured to control an operation of the transmission device 11, a brake control part 16b configured to control an operation of the left and right side brakes, a work device control part 16c configured to control an operation of a work device such as a rotary tilling device, a non-volatile onboard storage part 16d configured to store a preset target traveling route P (see, for example, FIG. 3) for automatic traveling, and the like, a steering angle setting part 16e configured to set a target steering angle of the left and right front wheels 7 to output the target steering angle to the power steering mechanism 12 during automatic traveling, and the like.

As illustrated in FIGS. 1 and 2, the positioning unit 19 includes a satellite navigation device 22 configured to measure a current position and a current azimuth of the tractor 1 by utilizing a Global Positioning System (GPS) being an example of a satellite positioning system (Navigation Satellite System: NSS), an inertial measurement unit (IMU) 23 including a three-axis gyroscope, a three-directional acceleration sensor, and the like, the inertial measurement unit (IMU) 23 configured to measure, for example, the posture and the azimuth of the tractor 1, and the like. Positioning methods utilizing the GPS include Differential GPS (DGPS, relative positioning method) and Real Time Kinematic GPS (RTK-GPS, interference positioning method). In the present embodiment, RTK-GPS, which is suitable for obtaining the position of a moving body, is adopted. Therefore, a reference station 24 that enables positioning by RTK-GPS is installed at a known position in the vicinity of a farm field.

As illustrated in FIG. 2, the tractor 1 and the reference station 24 respectively include GPS antennas 26 and 27 configured to receive a radio wave transmitted from a GPS satellite 25 (see FIG. 1), communication modules 28 and 29 that enable radio communication of various types of data including positioning data between the tractor 1 and the reference station 24, and the like. Therefore, the satellite navigation device 22 can measure a current position and a current azimuth of the tractor 1 with high accuracy, based on positioning data obtained by the GPS antenna 26 on the tractor side receiving a radio wave from the GPS satellite 25, and positioning data obtained by the GPS antenna 27 on the base station side receiving a radio wave from the GPS satellite 25. Further, the positioning unit 19 includes the satellite navigation device 22 and the inertial measurement unit 23, and thus, the positioning unit 19 can measure a current position, a current azimuth, and an attitude angle (yaw angle, roll angle, and pitch angle) of the tractor 1 with high accuracy.

The GPS antenna 26, the communication module 28, and the inertial measurement unit 23 provided in the tractor 1 are housed in an antenna unit 40, as illustrated in FIG. 1. The antenna unit 40 is arranged at the center in a left-right direction of the tractor 1 at an upper position on the front side outside the cabin 9. The antenna unit 40 is attached to an antenna unit support frame 41 that extends in the left-right direction of the tractor 1 and is fixed to the pillar frames 42 of the cabin 9.

As illustrated in FIG. 2, the mobile communication terminal 3 includes a terminal electronic control unit 30 including various types of control programs and the like for controlling an operation of the liquid crystal panel 4 and the like, and a communication module 31 that enables radio communication of various types of data including positioning data with the communication module 28 on the tractor side. The terminal electronic control unit 30 includes a traveling route generation part 32 configured to generate the target traveling route P (see, for example, FIG. 3) for travel guidance on which the tractor 1 automatically travels, and a non-volatile terminal storage part 33 configured to store, for example, various types of input data input by a user, and the target traveling route P generated by the traveling route generation part 32.

If the traveling route generation part 32 sets the target traveling route P, a user inputs vehicle data such as a type and a model of the work vehicle and the work device by following an input guidance for setting the target traveling route displayed on the liquid crystal panel 4 of the mobile communication terminal 3, and the input vehicle data is stored in the terminal storage part 33. A traveling area S to be set as the target traveling route P is a farm field, and the terminal electronic control unit 30 of the mobile communication terminal 3 acquires farm field data including a shape and a position of the farm field and stores the acquired data in the terminal storage part 33.

Figure 3:
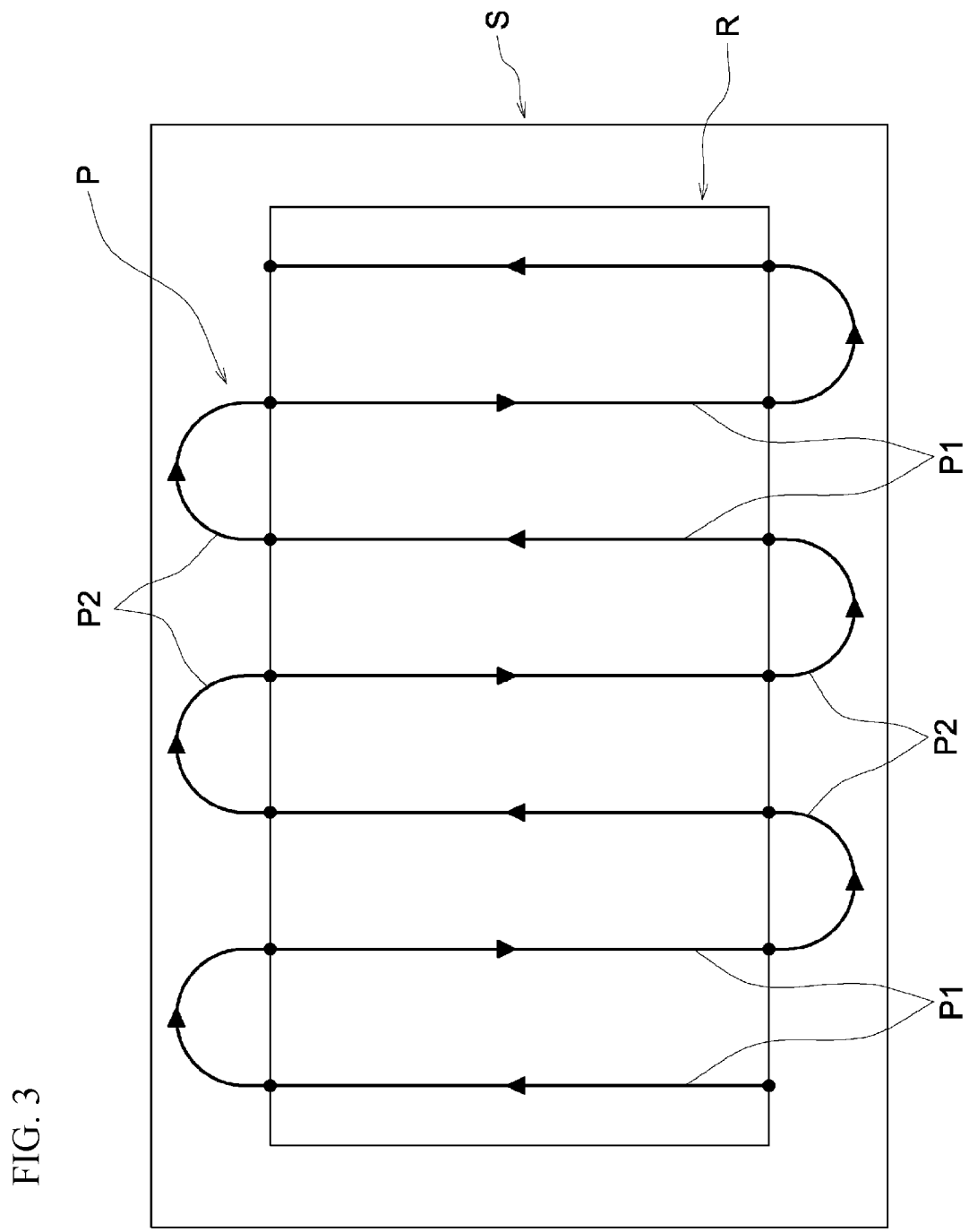
FIG. 3 is a diagram illustrating a target traveling route.

In the acquisition of the farm field data, when a user or the like operates the tractor 1 to cause the tractor 1 to actually travel, the terminal electronic control unit 30 can acquire position information for identifying a shape, position, and the like of the farm field from the current position of the tractor 1 and the like acquired by the positioning unit 19. The terminal electronic control unit 30 identifies the shape and position of the farm field from the acquired position information, and acquires the farm field data including the traveling area S identified from the shape and position of the identified farm field. FIG. 3 illustrates an example in which the identified traveling area S has a rectangular shape.

If the farm field data including the shape, position, and the like of the identified farm field is stored in the terminal storage part 33, the traveling route generation part 32 generates the target traveling route P by using the farm field data and the vehicle data stored in the terminal storage part 33.

As illustrated in FIG. 3, the terminal electronic control unit 30 first sets a work area R in the traveling area S. The work area R is an area where a predetermined work (for example, a work such as tilling) is performed while the tractor 1 automatically travels. The terminal electronic control unit 30 determines a turn traveling space necessary for turning the tractor 1, a safety space to be secured to prevent a problem such as the tractor 1 leaving the traveling area S, and the like, based on, for example, a turning radius and a front-rear width and a left-right width of the tractor 1 included in the vehicle data. Therefore, the terminal electronic control unit 30 sets the work area R inside the traveling area S in a state where the determined space within the outer periphery of the traveling area S is secured.

After the work area R is set, the traveling route generation part 32 generates the target traveling route P by using the vehicle data, the farm field data, and the like, as illustrated in FIG. 3. The target traveling route P includes, for example, a plurality of work paths P1 that are arranged in parallel at a constant interval corresponding to a work width and have the same straight travel distance, and a coupling path P2 coupling a starting end and a terminal end of adjacent work paths P1. The plurality of work paths P1 are paths for performing a predetermined work while the tractor 1 automatically travels, and the work paths P1 illustrated as an example in FIG. 3 are linear paths for advancing the tractor 1. The coupling path P2 is a path for changing a traveling direction of the tractor 1 and couples the terminal end of the work path P1 and the starting end of the next adjacent work path P1. In the example illustrated in FIG. 3, the coupling path P2 is a U-turn path for turning the tractor 1 to change the traveling direction of the tractor 1 by 180 degrees. Thus, the adjacent work paths P1 are set so that traveling directions are opposite to each other, and thus, the target traveling route P is set on which the tractor 1 performs a predetermined work while traveling back and forth on the plurality of work paths P1. It is noted that the target traveling route P illustrated in FIG. 3 is merely an example, and a target traveling route to be set can be changed appropriately.

The target traveling route P generated by the traveling route generation part 32 may be displayed on the liquid crystal panel 4, and is stored in the terminal storage part 33 as route data associated with the vehicle data, farm field data, and the like. The route data includes the azimuth angle of the target traveling route P, the set engine rotation speed and target traveling speed set in accordance with a traveling mode, and the like of the tractor 1 on the target traveling route P, and the like.

Thus, if the traveling route generation part 32 generates the target traveling route P, the terminal electronic control unit 30 transfers the route data from the mobile communication terminal 3 to the tractor 1, and thus, the onboard electronic control unit 16 of the tractor 1 can acquire the route data. The onboard electronic control unit 16 can cause the tractor 1 to automatically travel along the target traveling route P, based on the acquired route data while acquiring the current position of the onboard electronic control unit 16 (current position of the tractor 1) by the positioning unit 19. The current position of the tractor 1 acquired by the positioning unit 19 is transmitted from the tractor 1 to the mobile communication terminal 3 in real time (for example, in a period of a few seconds), and thus, the mobile communication terminal 3 grasps the current position of the tractor 1.

When the route data is transferred, before the tractor 1 starts the automatic traveling, the entire route data may be transferred from the terminal electronic control unit 30 to the onboard electronic control unit 16 all at once. Further, for example, the route data including the target traveling route P may be divided into a plurality of route portions each having a small amount of data for each predetermined distance. In this case, before the tractor 1 starts the automatic traveling, only an initial route portion of the route data may be transferred from the terminal electronic control unit 30 to the onboard electronic control unit 16, and after the start of the automatic traveling, each time when the tractor 1 reaches a route acquisition point set in accordance with the amount of data or the like, only the route data of the route portion corresponding to the route subsequent to the route acquisition point may be transferred from the terminal electronic control unit 30 to the onboard electronic control unit 16.

For example, when the user starts the automatic traveling of the tractor 1, the user moves the tractor 1 to a start point, if various types of automatic traveling start conditions are satisfied, when the user operates the liquid crystal panel 4 on the mobile communication terminal 3 to instruct the start of automatic traveling, the mobile communication terminal 3 transmits, to the tractor 1, an instruction to start automatic traveling. Therefore, in the tractor 1, the onboard electronic control unit 16 receives the instruction to start the automatic traveling, and thus, the onboard electronic control unit 16 starts automatic traveling control to cause the tractor 1 to automatically travel along the target traveling route P while acquiring the current position of the onboard electronic control unit 16 (current position of the tractor 1) by the positioning unit 19.

The automatic traveling control includes an automatic transmission control for automatically controlling an operation of the transmission device 11, an automatic braking control for automatically controlling an operation of the brake operation mechanism 13, an automatic steering control for automatically steering the left and right front wheels 7, an automatic work control for automatically controlling an operation of the work device such as the rotary tilling device, and the like.

In the automatic transmission control, the transmission control part 16a automatically controls the operation of the transmission device 11, based on the route data of the target traveling route P including the target traveling speed, the output of the positioning unit 19 and the output of the vehicle speed sensor 17, so that the target traveling speed set in accordance with the traveling mode and the like of the tractor 1 on the target traveling route P is obtained as the vehicle speed of the tractor 1.

In the automatic braking control, the brake control part 16b automatically controls the operation of the brake operation mechanism 13 based on the target traveling route P and the output of the positioning unit 19, so that in a braking area included in the route data of the target traveling route P, the left and right side brakes properly brake the left and right rear wheels 8.

In the automatic steering control, the steering angle setting part 16e obtains and sets the target steering angle of the left and right front wheels 7, based on the route data of the target traveling route P and the output of the positioning unit 19, and outputs the set target steering angle to the power steering mechanism 12, so that the tractor 1 automatically travels on the target traveling route P. The power steering mechanism 12 automatically steers the left and right front wheels 7, based on the target steering angle and the output of the steering angle sensor 18, so that the target steering angle is obtained as the steering angle of the left and right front wheels 7.

In the automatic work control, the work device control part 16c automatically controls the operation of the clutch operation mechanism 14 and the lifting drive mechanism 15 based on the route data of the target traveling route P and the output of the positioning unit 19, so that a predetermined work (for example, tilling work) by the work device is started as the tractor 1 reaches a work start point such as a starting end of the work path P1 (see, for example, FIG. 3), and the predetermined work by the work device is stopped as the tractor 1 reaches a work end point such as the terminal end of the work path P1 (see, for example, FIG. 3).

Thus, in the tractor 1, the automatic traveling unit 2 includes the transmission device 11, the power steering mechanism 12, the brake operation mechanism 13, the clutch operation mechanism 14, the lifting drive mechanism 15, the onboard electronic control unit 16, the vehicle speed sensor 17, the steering angle sensor 18, the positioning unit 19, the communication module 28, and the like.

In the present embodiment, it is not only possible to cause the tractor 1 to automatically travel without a user or the like riding in the cabin 9, but also to cause the tractor 1 to automatically travel with a user or the like riding in the cabin 9. Therefore, it is not only possible to cause the tractor 1 to automatically travel along the target traveling route P without a user or the like riding in the cabin 9 by the automatic traveling control of the onboard electronic control unit 16, but to cause the tractor 1 to automatically travel along the target traveling route P even with a user or the like riding in the cabin 9 by the automatic traveling control of the onboard electronic control unit 16.

If a user or the like is riding in the cabin 9, it is also possible to switch between an automatic traveling state where the tractor 1 automatically travels by the onboard electronic control unit 16, and a manual traveling state where the tractor 1 travels based on a driving operation of the user or the like. Therefore, it is possible to switch from the automatic traveling state to the manual traveling state while the tractor 1 automatically travels on the target traveling route P in the automatic traveling state, and on the other hand, it is also possible to switch from the manual traveling state to the automatic traveling state while the tractor 1 travels in the manual traveling state. For switching between the manual traveling state and the automatic traveling state, for example, a switching operation part for switching between the automatic traveling state and the manual traveling state may be provided in the vicinity of the seat 21, and the switching operation part may also be displayed on the liquid crystal panel 4 of the mobile communication terminal 3. Further, the automatic traveling state can be switched to the manual traveling state if the user operates the steering wheel 20 while the automatic traveling control is performed by the onboard electronic control unit 16.

The tractor 1 is capable of automatically traveling without a user or the like riding in the cabin 9, and thus, it is desirable to display a state of the tractor 1 so that a user, a person in the vicinity of the tractor 1, or the like can grasp the state of the tractor 1. Therefore, as illustrated in FIG. 2, the tractor 1 includes a state detection part 34 configured to detect a state of the tractor 1, a state display part 35 configured to provide a state display according to the state of the tractor 1 detected in the state detection part 34, and a state display control part 36 configured to control the state display of the state display part 35. In FIG. 1, the state display part 35 is omitted.

The onboard electronic control unit 16 grasps a traveling state of the tractor 1 such as the automatic traveling state or the manual traveling state, and if the traveling state is the automatic traveling state, the onboard electronic control unit 16 also grasps a state of the tractor 1 in the automatic traveling state. Therefore, the state detection part 34 detects the state of the tractor 1 according to the grasped condition of the onboard electronic control unit 16.

For example, the state detection part 34 detects the traveling state of the tractor 1 such as the automatic traveling state or the manual traveling state, and if the traveling state is the automatic traveling state, the state detection part 34 detects a state of the tractor 1 in the automatic traveling state. For example, the state detection part 34 detects whether the tractor 1 is in a state where the tractor 1 is ready for automatic traveling, in a state where the tractor 1 starts automatic traveling, in a state where the tractor 1 is automatically traveling, in a state where the tractor 1 temporarily stops the automatic traveling, or in a state where the tractor 1 stops the automatic traveling due to an emergency, for example.

In a case where the tractor 1 temporarily stops the automatic traveling, the user or the like can operate the mobile communication terminal 3 to temporarily stop the automatic traveling of the tractor 1, and the onboard electronic control unit 16 can temporarily stop the automatic traveling of the tractor 1 if an obstacle is detected or if there is a problem in acquiring the current position of the tractor 1, for example. Therefore, the state detection part 34 determines and detects whether the tractor 1 is in a state where the automatic traveling is temporarily stopped by the operation of the mobile communication terminal 3 or in a state where the automatic traveling is temporarily stopped by the onboard electronic control unit 16.

In a case where the tractor 1 stops the automatic traveling due to an emergency, the user or the like can operate the mobile communication terminal 3 to stop the automatic traveling of the tractor 1 due to an emergency, and the onboard electronic control unit 16 can stop the automatic traveling of the tractor 1 due to an emergency if a device provided in the tractor 1 breaks down or if the amount of deviation from the target traveling route P exceeds a predetermined amount, for example. Therefore, the state detection part 34 determines and detects whether the tractor 1 is in a state where the tractor 1 stops the automatic traveling due to an emergency by the operation of the mobile communication terminal 3 or in a state where the tractor 1 stops the automatic traveling due to an emergency by the onboard electronic control unit 16.

As illustrated in FIGS. 10 to 14, the state display part 35 includes, for example, a plurality of indicator lamps 35a to 35c (for example, three indicator lamps) different in lighting color and a support part 35d configured to support the indicator lamps 35a to 35c. The state display part 35 includes the support part 35d and the indicator lamps 35a to 35c arranged in this order from below, and each of the indicator lamps 35a to 35c is individually detachable.

The state display control part 36 changes which indicator lamp of the plurality of indicator lamps 35a to 35c in the state display part 35 to light up in accordance with the state of the tractor 1 to control a state display of the state display part 35.

For example, if the state detection part 34 detects a state where the tractor 1 manually travels, the state display control part 36 turns off all of the plurality of indicator lamps 35a to 35c in the state display part 35. If the state detection part 34 detects a state where the tractor 1 is ready for automatic traveling, the state display control part 36 lights up all of the plurality of indicator lamps 35a to 35c in the state display part 35. If the state detection part 34 detects a state where the tractor 1 is automatically traveling in the automatic traveling state, the state display control part 36 lights up only one specific indictor lamp of the plurality of indicator lamps 35a to 35c in the state display part 35. If the state detection part 34 detects a state where the tractor 1 temporarily stops the automatic traveling in the automatic traveling state, the state display control part 36 lights up only one other specific indicator lamp of the plurality of indicator lamps 35a to 35c in the state display part 35. Thus, the state display control part 36 changes the state display of the state display part 35 in accordance with the state of the tractor 1 detected in the state detection part 34, and thus, the user or the like can recognize the state of the tractor 1.

The state display part 35 is configured not only to provide a visual display to the user or the like, but also to provide acoustic notification. The state display part 35 includes, for example, a notification part such as a notification buzzer. The state display control part 36 not only changes a state display of the state display part 35, but also changes a method of providing a notification by the notification part in accordance with the state of the tractor 1 detected in the state detection part 34 so that the user or the like can recognize the state of the tractor 1. The method of providing a notification by the notification part can apply various types of methods including a method of providing a notification by the notification part only once, a method of intermittently providing a notification by the notification part a predetermined number of times, and a method of continuously providing a notification by the notification part.

An arrangement position of the state display part 35 will be described below with reference to FIGS. 4 to 9 and the like.

Various types of locations can be applied to the arrangement position of the state display part 35, however, the state display part 35 includes at least a pair of state display parts 35 arranged at diagonally opposed corners of the tractor 1 (corresponding to diagonally opposed corners of a work vehicle main body) in a plan view. In FIGS. 4 to 9, the arrangement position of the state display part 35 is mainly described, and thus, the antenna unit 40, the antenna unit support frame 41, the three-point link mechanism 5, and the like are omitted in the drawings.

In FIGS. 4 to 9, as indicated by the solid lines in the drawings, a first state display part 101 arranged at a position corresponding to the left front corner of the cabin 9 and a second state display part 102 arranged at a position corresponding to the right rear corner of the cabin 9 are provided as the state display part 35. Thus, the first state display part 101 and the second state display part 102 are arranged at positions corresponding to diagonally opposed corners of the cabin 9.

Figure 4:
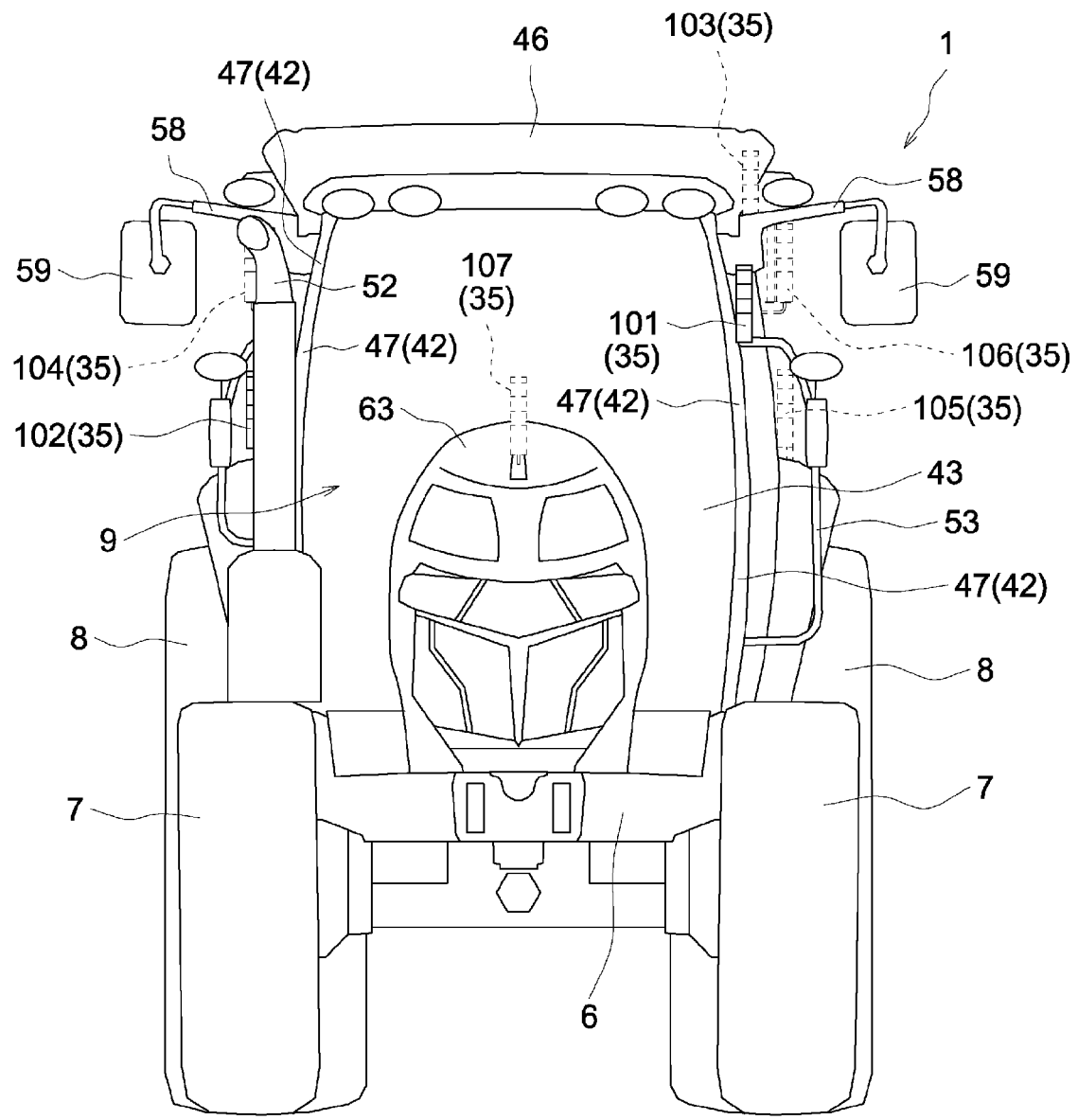
FIG. 4 is a diagram illustrating a tractor in a front view.
Figure 6:
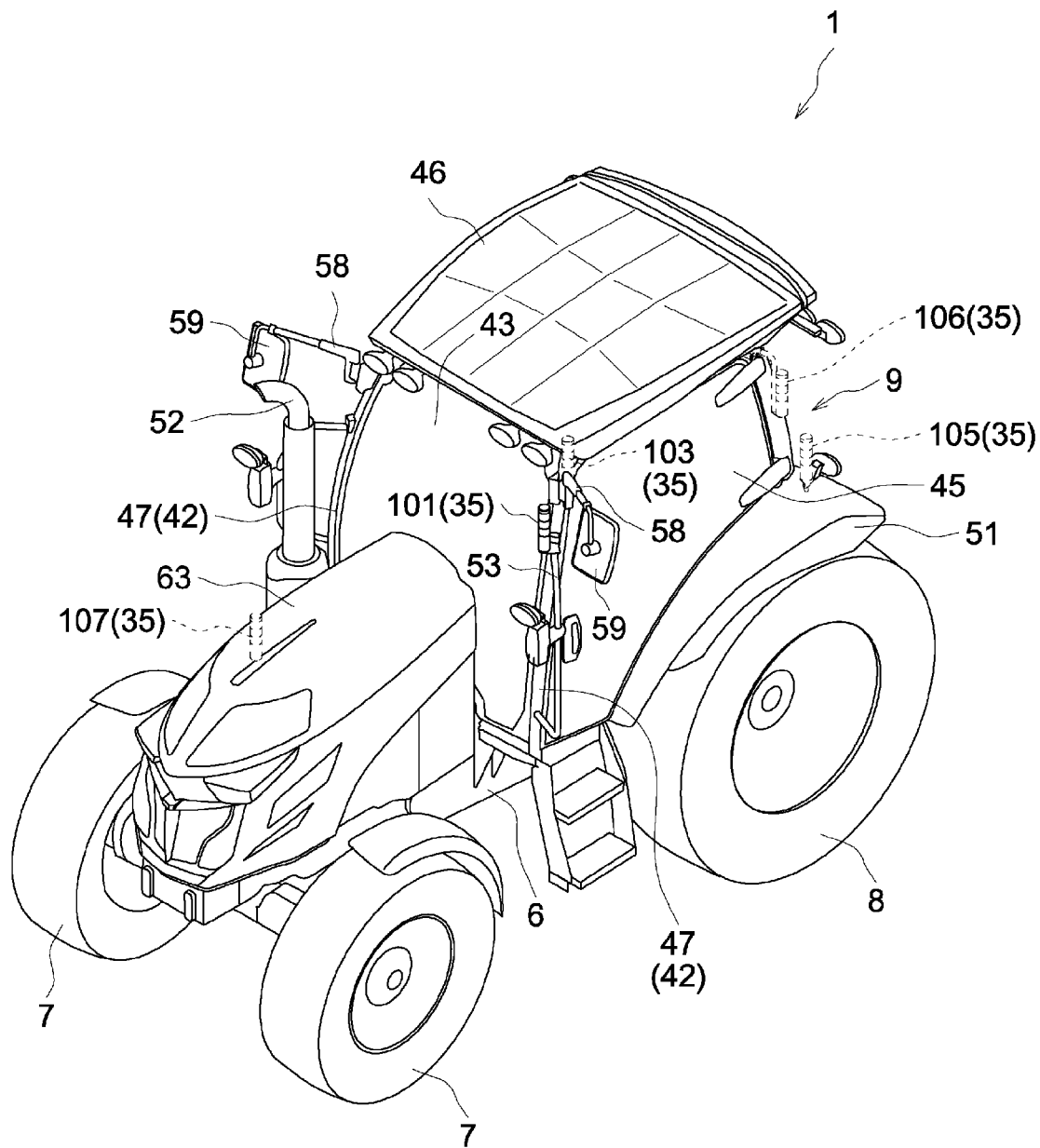
FIG. 6 is a perspective view illustrating the tractor in an oblique left front view.
Figure 8:
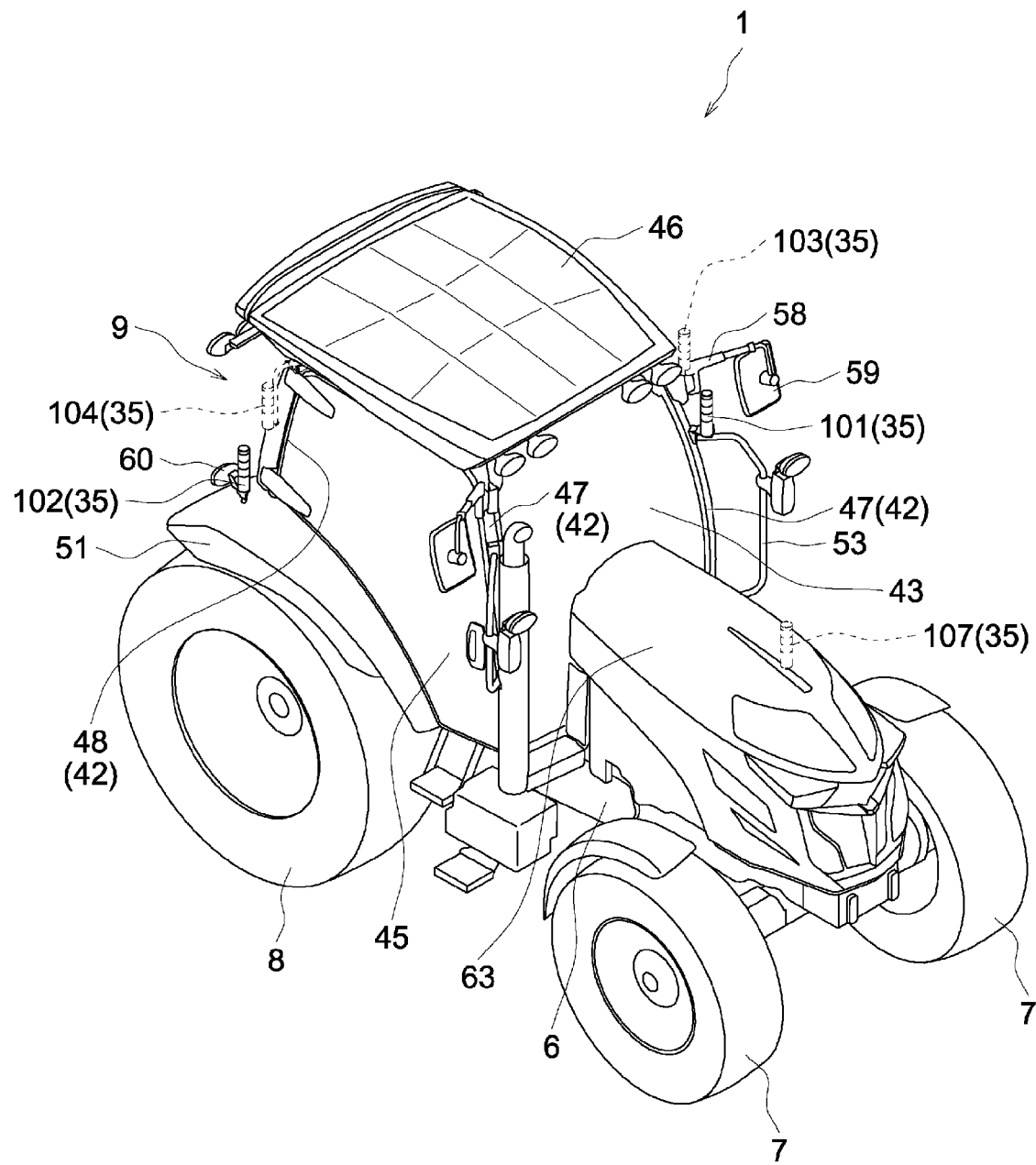
FIG. 8 is a perspective view illustrating the tractor in an oblique right front view.

As illustrated in FIGS. 4, 6, and 8, the first state display part 101 is arranged near the left front pillar 47 at a position corresponding to the left front corner of the cabin 9. A muffler 52 extending in the up-down direction is arranged in front of the cabin 9 at a position corresponding to the right front corner of the cabin 9, and thus, the first state display part 101 is arranged on the side opposite to the muffler 52 in the left-right direction of the cabin 9 and in front of the cabin 9. The first state display part 101 is arranged below the roof 46 in the up-down direction and at a position corresponding to an upper region of the windshield 43. For example, the first state display part 101 can be arranged so that, if a user or the like sitting on the seat 21 in the cabin 9 views the first state display part 101, the left front pillar 47 overlaps at least a part of the first state display part 101, and at least a part of the first state display part 101 is hidden by the left front pillar 47.

Figure 10:
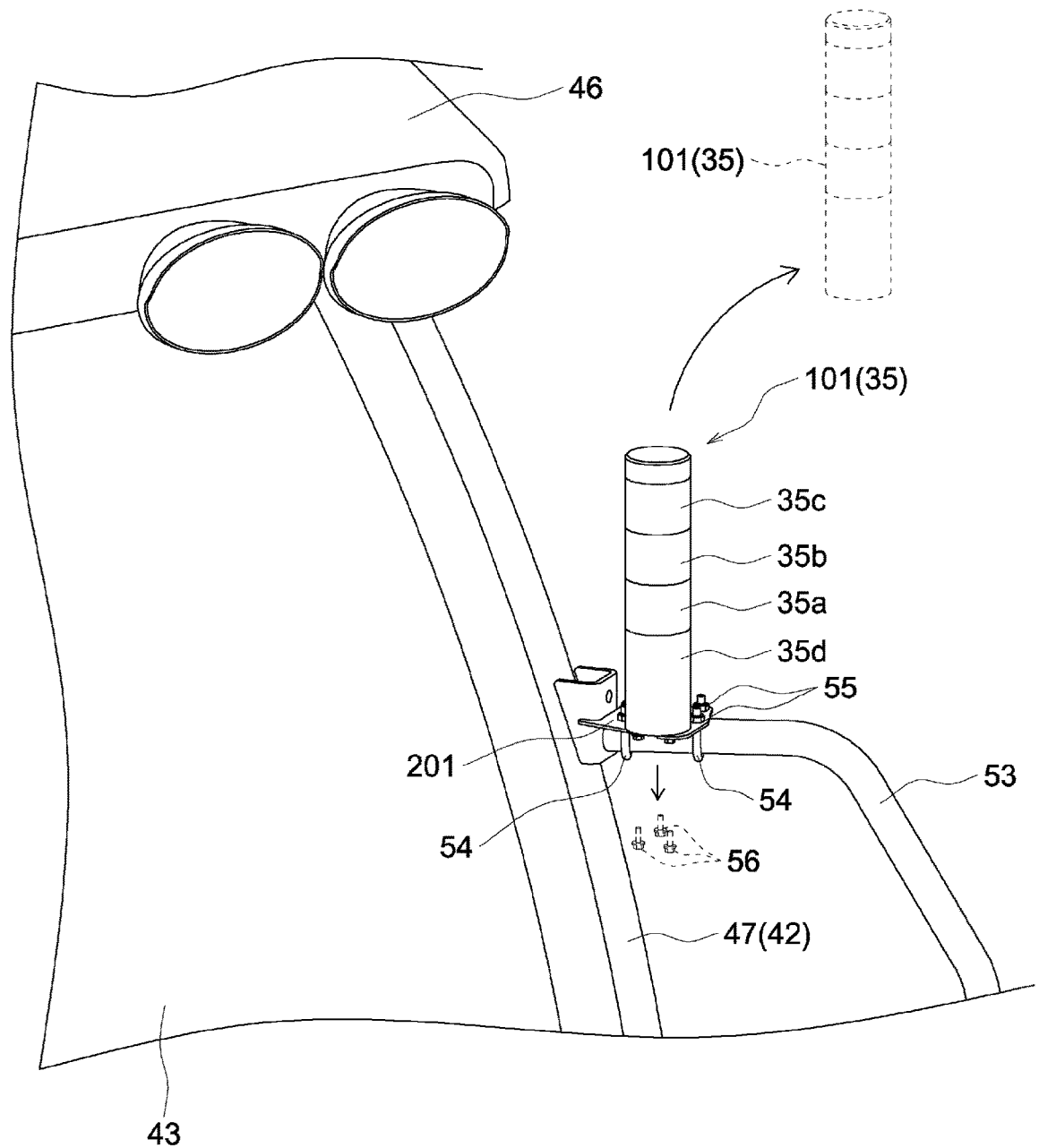
FIG. 10 is a diagram illustrating a configuration where a first state display part is mounted.

As illustrated in FIGS. 4, 6, and 8, a handrail 53 extending in the up-down direction is attached to the left front pillar 47, and thus, the first state display part 101 is attached by utilizing the handrail 53. As illustrated in FIG. 10, a plate-shaped support stay 201 is provided at an upper end portion of the handrail 53, and the first state display part 101 is provided in an upright posture extending upward from the support stay 201. Thus, the first state display part 101 is attached to the left front pillar 47 of the pillar frames 42 via the support stay 201 and the handrail 53. Therefore, the first state display part 101 is attached to the cabin frame forming the cabin 9 for which anti-vibration measures are taken, and thus, vibrations from the engine 10 and the like are prevented from being transmitted to the first state display part 101.

As illustrated in FIG. 10, the support stay 201 is attached to the handrail 53 by using an attachment tool such as a bolt and nut. For example, the support stay 201 is brought into a lateral posture where the support stay 201 contacts the handrail 53 from above, U-shaped bolts 54 are brought into contact with the handrail 53 from below, pass through holes of the support stay 201, and are fastened with nuts 55 to attach the support stay 201 to the handrail 53. Further, the first state display part 101 is attachably and detachably provided on the support stay 201 by using an attachment tool 56 such as a bolt. For example, the first state display part 101 is attached to the support stay 201 by fastening the attachment tool 56 into a hole formed in the support part 35d in a state where the attachment tool 56 is inserted into a hole of the support stay 201. In FIG. 10, a state where the first state display part 101 and the attachment tool 56 are detached is illustrated by a dotted line. Therefore, the first state display part 101 is provided attachably and detachably with respect to the handrail 53 together with the support stay 201, and the first state display part 101 alone is provided attachably and detachably with respect to the support stay 201.

Figure 5:
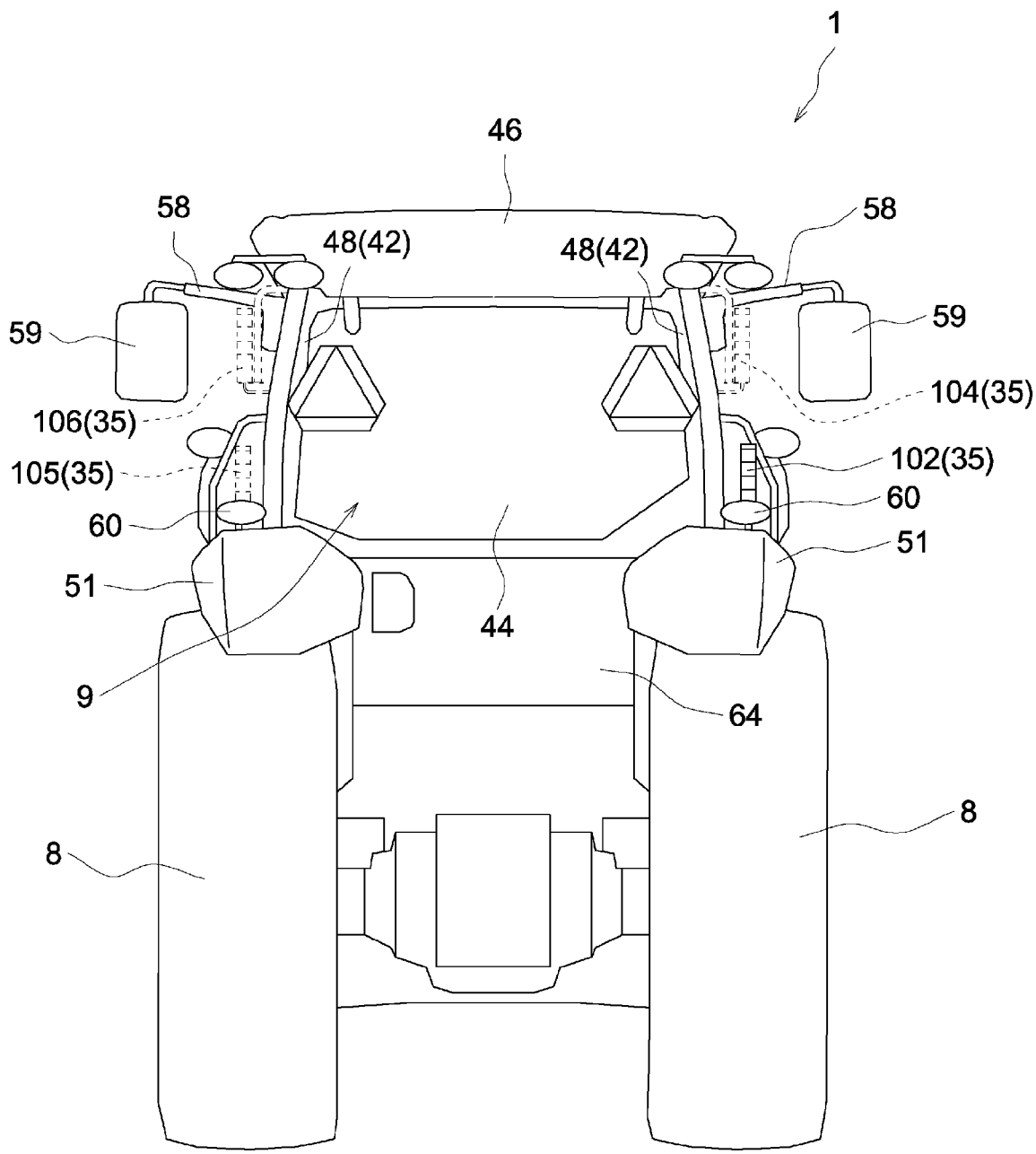
FIG. 5 is a diagram illustrating the tractor in a rear view.
Figure 7:
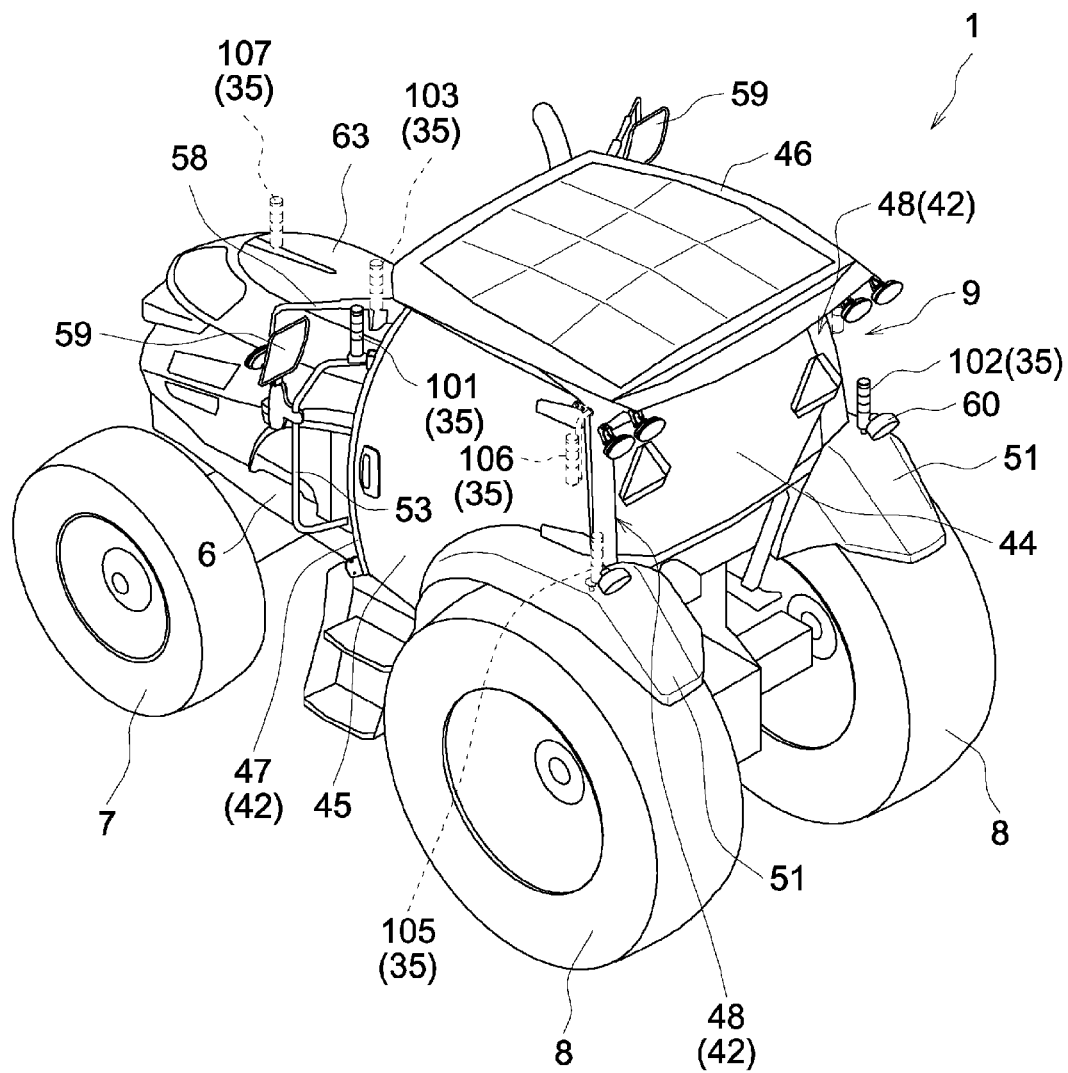
FIG. 7 is a perspective view illustrating the tractor in an oblique left rear view.
Figure 9:
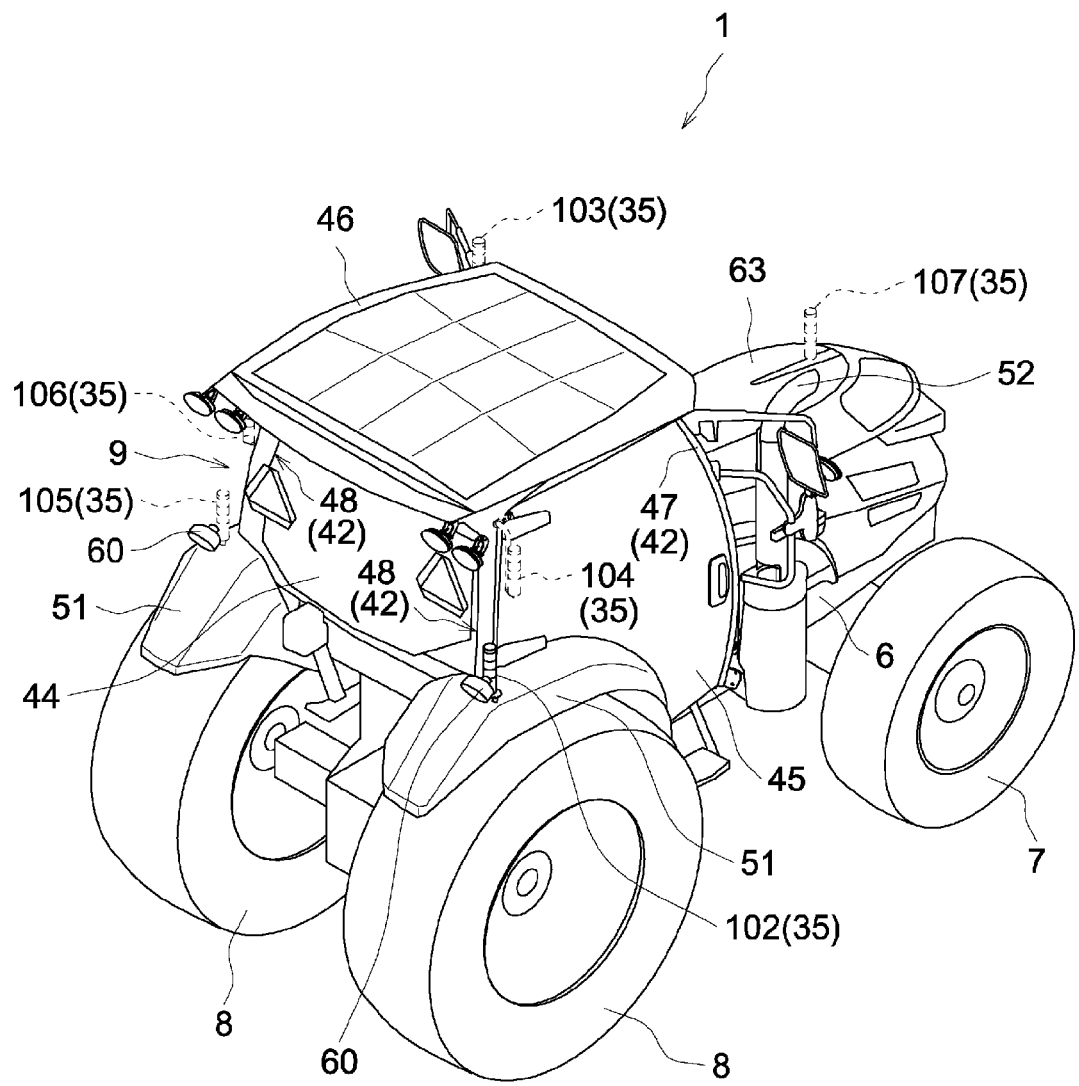
FIG. 9 is a perspective view illustrating the tractor in an oblique right rear view.
Figure 11:
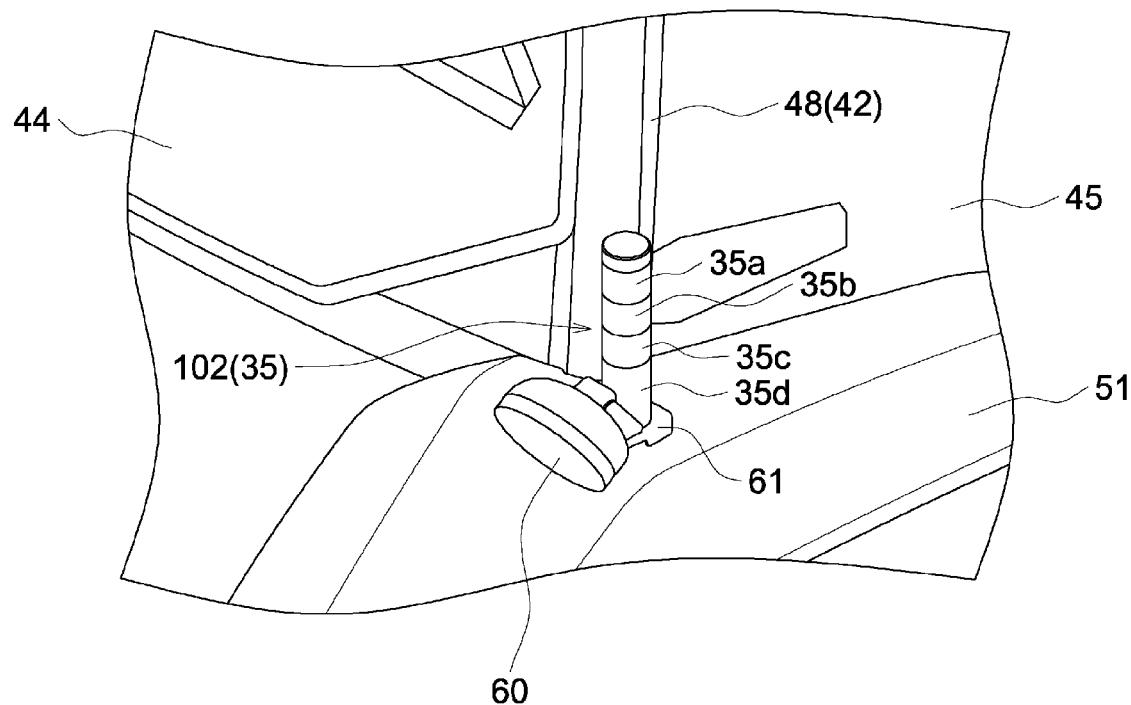
FIG. 11 is a diagram illustrating a configuration where a second state display part is mounted.

As illustrated in FIGS. 5, 7, and 9, the second state display part 102 is arranged near the right rear pillar 48 at a position corresponding to the right rear corner of the cabin 9. The fender 51 is provided at a position corresponding to the right rear corner of the cabin 9, and thus, the second state display part 102 is attached by utilizing the fender 51. As illustrated in FIG. 11, a lower rear light 60 configured to illuminate the lower rear side of the tractor 1 is attached to the upper part of the fender 51 via a light support stay 61. The second state display part 102 is provided in an upright posture extending upward from the light support stay 61.

For example, the second state display part 102 can be arranged so that, if a user or the like sitting on the seat 21 in the cabin 9 views the second state display part 102, the right rear pillar 48 overlaps at least a part of the second state display part 102, and at least a part of the second state display part 102 is hidden by the right rear pillar 48.

As illustrated in FIG. 11, the light support stay 61 for supporting the lower rear light 60 is also used as a support stay for supporting the second state display part 102. The light support stay 61 is attached to the upper part of the fender 51 by passing an attachment tool such as a bolt and nut through a through hole formed in the fender 51 and attaching the attachment tool. The second state display part 102 is attached to the fender 51 being the cabin frame forming the cabin 9, via the light support stay 61. The fender 51 is integrally provided with the pillar frames 42 and the like as the cabin frame forming the cabin 9. Therefore, the second state display part 102 is attached to the cabin frame forming the cabin 9 for which anti-vibration measures are taken, and thus, vibrations from the engine 10 and the like are prevented from being transmitted to the second state display part 102.

FIG. 11 illustrates an example where, if the lower rear light 60 is provided, the second state display part 102 is attached to the fender 51 by using the light support stay 61 to which the lower rear light 60 is attached. However, the second state display part 102 may also be attached to the fender 51 by using the light support stay 61 without providing the lower rear light 60, for example. Further, even if the lower rear light 60 is provided, a support stay for attaching the lower rear light 60 and a support stay for attaching the second state display part 102 may also be separately provided to separately attach the lower rear light 60 and the second state display part 102 to the fender 51.

Further, although not illustrated, similarly to the first state display part 101, the second state display part 102 is provided attachably and detachably with respect to the light support stay 61 by using an attachment tool such as a bolt. Therefore, the second state display part 102 is provided attachably and detachably with respect to the fender 51 together with the light support stay 61 and the lower rear light 60, and the second state display part 102 alone is provided attachably and detachably with respect to the light support stay 61.

The first state display part 101 and the second state display part 102 are attachably and detachably provided in desired arrangement positions, and thus, the tractor 1 can automatically travel in the traveling area S such as a farm field in a state where the first state display part 101 and the second state display part 102 are attached in the desired arrangement positions, for example. Further, if the tractor 1 manually travels by a user or the like outside the traveling area S, for example, if the tractor 1 moves from a storage location to a farm field or if the tractor 1 moves between farm fields, the tractor 1 can travel in a state where the first state display part 101 and the second state display part 102 are removed from the desired arrangement positions. Thus, the user or the like can attach and detach the first state display part 101 and the second state display part 102 as needed. At this time, the first state display part 101 and the second state display part 102 are arranged below the roof 46. Therefore, the first state display part 101 and the second state display part 102 are within the reach of the user or the like if the user or the like rides in the cabin 9 or steps on a stepladder, and thus, the first state display part 101 and the second state display part 102 can be easily attached and detached.

Further, the first state display part 101 and the second state display part 102 are arranged below the roof 46, and thus, it is possible to prevent an increase in the vehicle height of the tractor 1 in a state where the first state display part 101 and the second state display part 102 are attached in the desired arrangement setting. Therefore, if the tractor 1 is transported or if the tractor 1 is stored in a barn or the like, it is possible to prevent the first state display part 101 and the second state display part 102 from contacting an object to sustain damage.

The arrangement position of the state display control part 36 will be described based on FIG. 15.

As described above, the front floor frame 49, the rear floor frame 50, the rear frame 64, and the pair of left and right fenders 51 are provided as the frame forming the floor of the cabin 9. The width of the rear floor frame 50 in the left-right direction is narrower than that of the front floor frame 49. Each of the pair of left and right fenders 51 includes an operation panel part 62 provided with various types of operation tools protruding inward in the left-right direction.

The state display control part 36 is provided inside the operation panel part 62 on the right side in the cabin 9. Not only the state display control part 36 but also control parts in the onboard electronic control unit 16 are arranged inside the operation panel part 62 on the right side. As described above, the inner space of the operation panel part 62 is used to intensively arrange a plurality of control parts in the onboard electronic control unit 16 inside the operation panel part 62 on the right side. Therefore, it is possible to collectively place a plurality of wirings of each of the control parts, arrange the plurality of wirings through a common communication part communicating the inside of the cabin 9 with the outside, and simplify the wiring work and wiring configuration.

Although not illustrated in the drawings, for example, an operation tool such as a lifting operation tool that enables a manual lifting operation of a work device such as a rotary tilling device or a PTO operation tool for starting transmitting power to a PTO is provided in the operation panel part 62 on the right side, and various types of other operation tools are provided in the operation panel part 62 on the left side.

As illustrated by dotted lines in FIGS. 4 to 9, other than the arrangement positions of the first state display part 101 and the second state display part 102, various types of locations can be employed for the arrangement position of the state display part 35. An arrangement position of the state display part 35 other than the arrangement positions of the first state display part 101 and the second state display part 102 will be described below.

As described above, if the state display part 35 is arranged at a position corresponding to the left front corner of the cabin 9, the arrangement position of the first state display part 101 can be adopted, however, instead of this, a third state display part 103 may be arranged above the first state display part 101, as illustrated in FIGS. 4, 6, and 8.

As illustrated in FIGS. 4, 6, and 8, a mirror mounting part 58 is attached to the left front pillar 47 and a mirror 59 is mounted in the mirror mounting part 58, and thus, the third state display part 103 is attached by utilizing the mirror mounting part 58. For example, the third state display part 103 can be arranged so that, if a user or the like sitting on the seat 21 in the cabin 9 views the third state display part 103, the left front pillar 47 overlaps at least a part of the third state display part 103, and at least a part of the third state display part 103 is hidden by the left front pillar 47.

Figure 12:
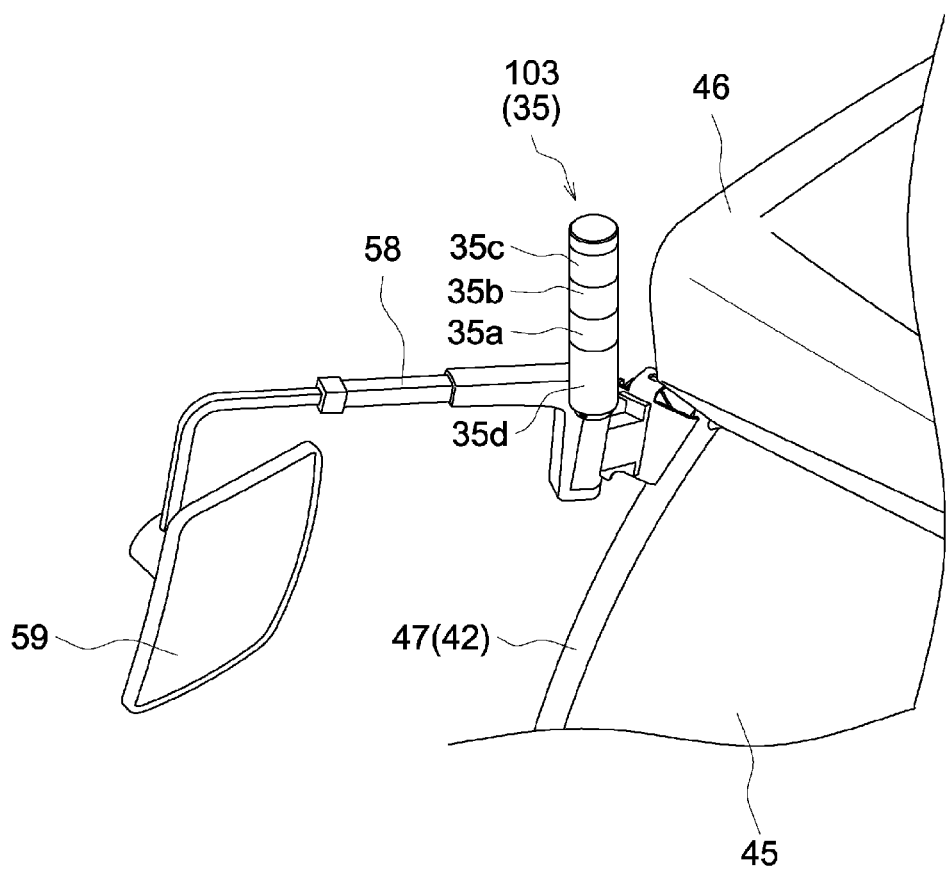
FIG. 12 is a diagram illustrating a configuration where a third state display part is mounted.

As illustrated in FIG. 12, the third state display part 103 is provided in an upright posture extending upward from the mirror mounting part 58, and the mirror mounting part 58 for mounting the mirror 59 is also used as a support stay for supporting the third state display part 103. The mirror mounting part 58 is attached to the left front pillar 47, and thus, the third state display part 103 is attached to the left front pillar 47 of the pillar frames 42 via the mirror mounting part 58. Therefore, the third state display part 103 is attached to the cabin frame forming the cabin 9 for which anti-vibration measures are taken, and thus, vibrations from the engine 10 and the like are prevented from being transmitted to the third state display part 103.

Although not illustrated, similarly to the first state display part 101, the third state display part 103 is provided attachably and detachably with respect to the mirror mounting part 58 by using an attachment tool such as a bolt. Therefore, the third state display part 103 alone is provided attachably and detachably with respect to the mirror mounting part 58.

As described above, if the state display part 35 is arranged at a position corresponding to the right rear corner of the cabin 9, the arrangement position of the second state display part 102 can be adopted, however, instead of this, a fourth state display part 104 may be arranged above the second state display part 102, as illustrated in FIGS. 5, 8, and 9.

As illustrated in FIGS. 5, 8, and 9, the fourth state display part 104 is arranged below the roof 46 in the up-down direction and at a position corresponding to an upper region of the right door 45. For example, the fourth state display part 104 may be arranged so that, if a user or the like sitting on the seat 21 in the cabin 9 views the fourth state display part 104, the right rear pillar 48 overlaps at least a part of the fourth state display part 104, and at least a part of the fourth state display part 104 is hidden by the right rear pillar 48.

Figure 13:
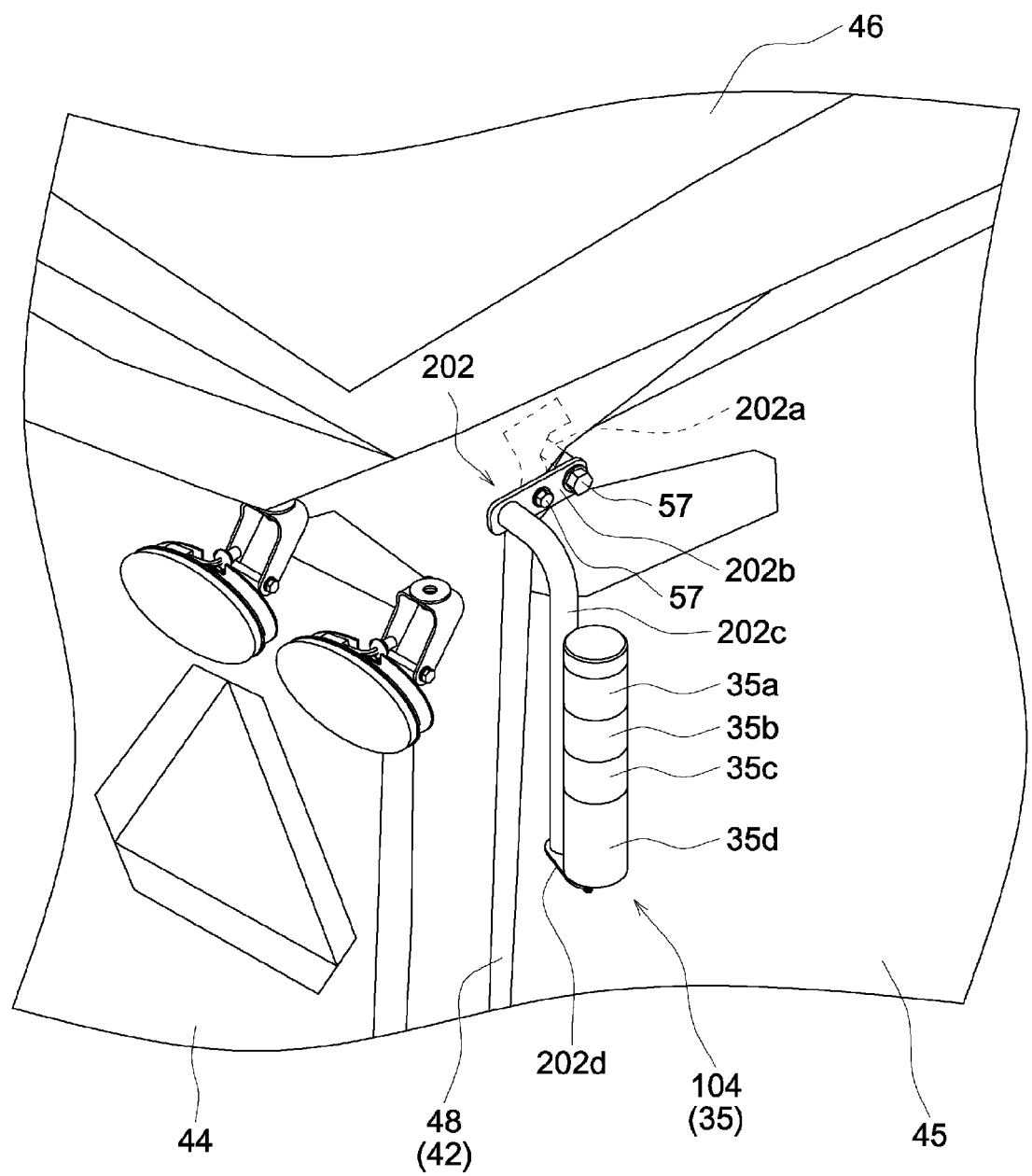
FIG. 13 is a diagram illustrating a configuration where a fourth state display part is mounted.

As illustrated in FIG. 13, the fourth state display part 104 is attached to the right rear pillar 48 of the pillar frames 42 via a support stay 202. The support stay 202 includes a first stay 202*a* extending from the upper end of the right rear pillar 48 to the outside of the cabin 9, a plate-shaped second stay 202*b* coupled to the first stay 202*a* and extending rearward, and a third stay 202*c* extending downward from the rear end of the second stay 202*b* and including a plate-shaped part 202*d* at a lower end of the third stay 202*c*. The fourth state display part 104 is provided in an upright posture extending upward from the plate-shaped part 202*d* of the third stay 202*c*.

Thus, the fourth state display part 104 is attached to the right rear pillar 48 of the pillar frames 42 via the support stay 202. Therefore, the fourth state display part 104 is attached to the cabin frame forming the cabin 9 for which anti-vibration measures are taken, and thus, vibrations from the engine 10 and the like are prevented from being transmitted to the fourth state display part 104.

The second stay 202*b* is fixed to the first stay 202*a* by fastening an attachment tool 57 such as a bolt, and the third stay 202*c* is integrally coupled to the second stay 202*b* by welding or the like. Further, although not illustrated, similarly to the first state display part 101, the fourth state display part 104 is provided attachably and detachably with respect to the third stay 202*c* of the support stay 202 by using an attachment tool such as a bolt.

Therefore, the fourth state display part 104 is provided attachably and detachably with respect to the right rear pillar 48 together with the second stay 202*b* and the third stay 202*c* of the support stay 202, and the fourth state display part 104 alone is provided attachably and detachably with respect to the third stay 202*c* of the support stay 202.

Above, an example is illustrated where the first to fourth state display parts 101 to 104 are arranged at diagonally opposed corners at the left front and right rear of the cabin 9. However, the state display part 35 may be arranged at a position corresponding to the left rear corner of the cabin 9.

As illustrated in FIGS. 5 to 7, a fifth state display part 105 may be arranged, as the state display part 35, near the left rear pillar 48 at a position corresponding to the left rear corner of the cabin 9. Similarly to the second state display part 102, the fifth state display part 105 is arranged to the upper part of the fender 51. The configuration where the fifth state display part 105 is mounted is similar to that of the second state display part 102, and thus, description thereof will be omitted.

As illustrated in FIGS. 5 to 7, a sixth state display part 106 may be arranged, as the state display part 35, instead of the fifth state display part 105, below the roof 46 in the up-down direction and at a position corresponding to an upper region of the right door 45. The configuration where the sixth state display part 106 is mounted is similar to that of the fourth state display part 104, and thus, description thereof will be omitted.

Figure 14:
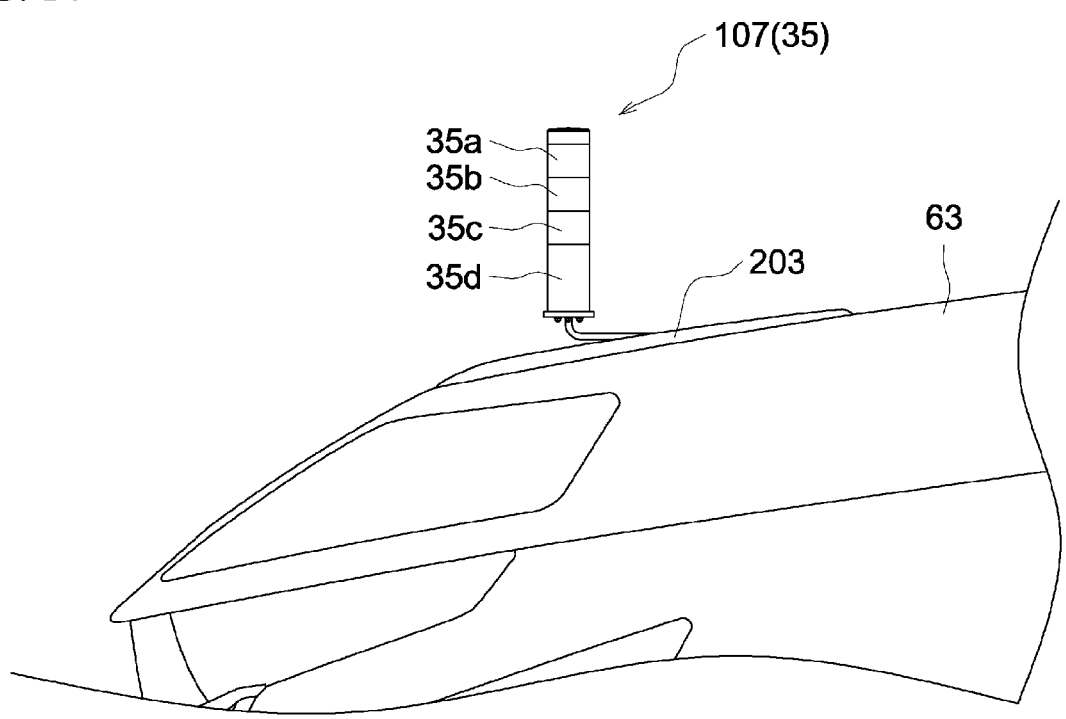
FIG. 14 is a diagram illustrating a configuration where a seventh state display part is mounted.

As illustrated in FIGS. 4, 6, and 8, a seventh state display part 107 may be arranged, as the state display part 35, in front of the cabin 9. As illustrated in FIG. 14, the seventh state display part 107 is arranged above a hood 63 via a support stay 203.

As described above, for the arrangement position of the state display part 35, at least a pair of the state display parts 35 (the pair including the first state display part 101 or the third state display part 103 and the second state display part 102 or the fourth state display part 104) may be arranged at diagonally opposed corners of the tractor 1 in a plan view. For example, if the first state display part 101 and the second state display part 102 are arranged at positions corresponding to diagonally opposed corners of the cabin 9 of the tractor 1, as illustrated in FIGS. 4 to 9, a user or a person in the vicinity of the tractor 1 viewing the tractor 1 from any direction can visually recognize at least any one of the first state display part 101 and the second state display part 102. Therefore, the user or the person in the vicinity of the tractor 1 can easily grasp the state of the tractor 1, and the visibility of the state display part 35 can be improved. Similarly, if the third state display part 103 is provided instead of the first state display part 101 and the fourth state display part 104 is provided instead of the second state display part 102, the visibility of the state display part 35 can also be improved.

Further, as illustrated in FIGS. 4 and 5, the first state display part 101 and the second state display part 102 are arranged outside the cabin 9 and inside the outer ends of wheels 7 and 8 (corresponding to traveling parts) of the tractor 1 in the left-right direction of the tractor 1 in a front view and a rear view. Therefore, the first state display part 101 and the second state display part 102 do also not protrude outside from the wheels 7 and 8 in the left-right direction of the tractor 1, and thus, it is possible to prevent the first state display part 101 and the second state display part 102 from contacting an object to sustain damage during the automatic traveling and the like of the tractor 1. Similarly, if the third state display part 103 is provided instead of the first state display part 101 and the fourth state display part 104 is provided instead of the second state display part 102, the third state display part 103 and the fourth state display part 104 are arranged outside the cabin 9 and inside the outer ends of the wheels 7 and 8 (corresponding to traveling parts) of the tractor 1 in the left-right direction of the tractor 1 in a front view and a rear view.

The configuration is such that two arrangement positions spaced apart in the up-down direction therebetween are selectable for the arrangement positions of the state display part 35, among the position corresponding to the left front corner of the cabin 9, the position corresponding to the right rear corner of the cabin 9, and the position corresponding to the left rear corner of the cabin 9. Therefore, it is possible to select any of the two arrangement positions for the arrangement positions of the state display part 35 with considering the preference and visibility of the user or the like. In particular, an arrangement position corresponding to an upper portion of the cabin 9 and an arrangement position corresponding to a lower portion of the cabin 9 can be selected for the position corresponding to the right rear corner of the cabin 9 and the position corresponding to the left rear corner of the cabin 9, and thus, the arrangement positions of the state display part 35 can be usefully selected in accordance with the preference or visibility of the user and the like.

The state display part 35 is provided attachably and detachably with respect to a desired arrangement position, and thus, the arrangement position of the state display part 35 may be changed in accordance with the situation such as a change in a working state. For example, at the position corresponding to the right rear corner of the cabin 9, the arrangement position of the state display part 35 can be changed to an upper arrangement position in accordance with the situation by changing the arrangement position of the state display part 35 from the arrangement position of the second state display part 102 to the arrangement position of the fourth state display part 104.

Other Embodiments

Other embodiments of the present invention will be described.

Each of configurations of embodiments described below may be applied not only alone, but may be applied also in combination with the configuration of another embodiment.

(1) Various modifications may be made to the configuration of the work vehicle.

For example, the work vehicle may be configured to follow a hybrid specification in which the engine 10 and an electric motor for traveling are provided, or may be configured to follow an electric specification in which an electric motor for traveling is provided instead of the engine 10.

For example, the work vehicle may be configured to follow a semi-crawler specification in which left and right crawlers are provided for the traveling part instead of the left and right rear wheels 8.

For example, the work vehicle may be configured to follow a rear wheel steering specification in which the left and right rear wheels 8 function as steering wheels.

(2) In the above-described embodiment, the state display part 35 includes the plurality of indicator lamps 35a to 35c, however, the number of indicator lamps may be appropriately changed, and the state display part 35 may include one indicator lamp or four or more indicator lamps. In this case, the indicator lamps may be individually attached and detached, and thus, it is possible to easily add or reduce the number of indicator lamps.

(3) In the above-described embodiment, an example of the arrangement positions of the state display part 35 is illustrated where at least a pair of the state display parts 35 are arranged at diagonally opposed corners of the tractor 1 in a plan view, however, the combination of the arrangement positions of the state display part 35 can be appropriately changed.

For example, only the seventh state display part 107 arranged above the hood 63 may be provided as the state display part 35. Further, the seventh state display part 107 arranged above the hood 63 and any one of the second state display part 102, the fourth state display part 104, the fifth state display part 105, and the sixth state display part 106 arranged behind the cabin 9 may be provided as the state display part 35. Further, any one of the second state display part 102 and the fourth state display part 104 arranged at a position corresponding to the right rear corner of the cabin 9, and any one of the fifth state display part 105 and the sixth state display part 106 arranged at a position corresponding to the left rear corner of the cabin 9 may be provided as the state display part 35.

INDUSTRIAL APPLICABILITY

The present invention may be applied to various types of work vehicles capable of automatically traveling.

DESCRIPTION OF REFERENCE NUMERALS

1 Tractor (Work vehicle main body)
9 Cabin
7 Front wheels (traveling part)
8 Rear wheels (traveling part)
34 State detection part
35 State display part
36 State display control part
47 Front pillar (Cabin frame)
48 Rear pillar (Cabin frame)
51 Fender (Cabin frame)
52 Muffler
58 Mirror mounting part (Support stay)
61 Light support stay (Support stay)
201 Support stay
202 Support stay

The invention claimed is:

1. A work vehicle comprising:
a work vehicle main body capable of automatically traveling;
a state detection part configured to detect a state of the work vehicle main body; and
a state display part configured to provide a state display in accordance with the state of the work vehicle main body detected in the state detection part,
wherein the state display part includes a pair of the state display parts arranged at diagonally opposed corners of the work vehicle main body, and the state display part is not arranged at diagonally opposed corners intersecting a diagonal line connecting the diagonally opposed corners where the pair of state display parts are arranged.

2. The work vehicle according to claim 1, wherein the work vehicle main body includes a cabin, and
the state display part is arranged outside the cabin and inside an outer end of a traveling part of the work vehicle main body in a front view.

3. The work vehicle according to claim 2, wherein a muffler is provided in front of the cabin and on one side in a left-right direction of the cabin, and
one state display part of the pair of state display parts is arranged in front of the cabin and on an opposite side of the muffler in the left-right direction of the cabin.

4. The work vehicle according to claim 2, wherein the state display part is provided attachably and detachably with respect to a cabin frame of the cabin via a support stay.

5. The work vehicle according to claim 2, comprising a state display control part configured to control a state display of the state display part,
wherein the state display control part is arranged inside an operation panel part in the cabin.

* * * * *